United States Patent
Horigome et al.

(10) Patent No.: US 9,966,098 B2
(45) Date of Patent: May 8, 2018

(54) OPTICAL INFORMATION RECORDING MEDIUM AND OPTICAL INFORMATION RECORDING MEDIUM REPRODUCING DEVICE

(71) Applicant: SONY CORPORATION, Tokyo (JP)

(72) Inventors: Toshihiro Horigome, Kanagawa (JP); Satoru Higashino, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days. days.

(21) Appl. No.: 15/321,821

(22) PCT Filed: Jun. 9, 2015

(86) PCT No.: PCT/JP2015/002882
§ 371 (c)(1),
(2) Date: Dec. 23, 2016

(87) PCT Pub. No.: WO2016/031106
PCT Pub. Date: Mar. 3, 2016

(65) Prior Publication Data
US 2017/0133050 A1    May 11, 2017

(30) Foreign Application Priority Data
Aug. 29, 2014  (JP) .................. 2014-174964

(51) Int. Cl.
*G11B 7/007*   (2006.01)
*G11B 20/12*   (2006.01)
*G11B 7/0037*  (2006.01)

(52) U.S. Cl.
CPC .......... *G11B 7/00718* (2013.01); *G11B 7/007* (2013.01); *G11B 7/0079* (2013.01); *G11B 20/1217* (2013.01); *G11B 7/0037* (2013.01); *G11B 2007/00754* (2013.01); *G11B 2020/1267* (2013.01); *G11B 2020/1268* (2013.01); *G11B 2020/1287* (2013.01)

(58) Field of Classification Search
None
See application file for complete search history.

(56) References Cited

U.S. PATENT DOCUMENTS

2014/0036652 A1*  2/2014  Kikugawa .......... G11B 7/00718
                                                                369/275.4

FOREIGN PATENT DOCUMENTS

| JP | 2004-310958 | 11/2004 |
| JP | 2006-197375 | 7/2006 |
| JP | 4121265 | 7/2008 |
| JP | 2014-032711 | 2/2014 |
| JP | 2014-149892 | 8/2014 |

* cited by examiner

Primary Examiner — Brian Butcher
(74) Attorney, Agent, or Firm — Paratus Law Group, PLLC

(57) ABSTRACT

Provided is an optical information recording medium including: a continuously wobbling groove formed in advance by a CAV or a zone CAV. Information is allowed to be recorded on the groove and a land adjacent to the groove, address information is recorded by modulating the wobble, the address information includes a sync pattern indicating a position of the address information and address data, and the sync pattern includes a plurality of first wobble patterns and a second wobble pattern between the first wobble patterns, and at least part of intervals of the first wobble patterns are set to unequal intervals.

14 Claims, 11 Drawing Sheets

FIG.1
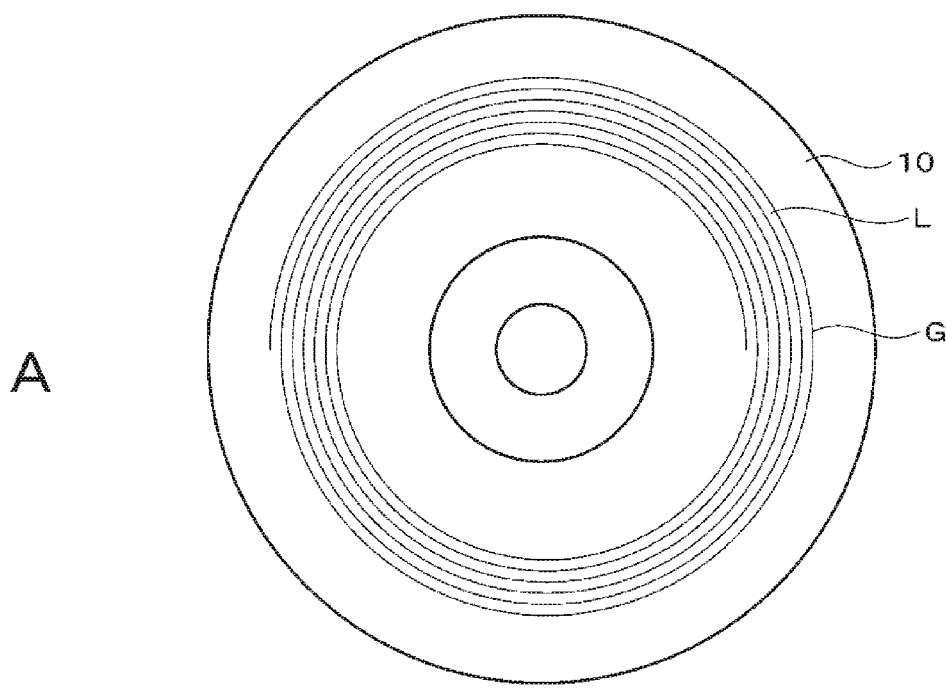
A
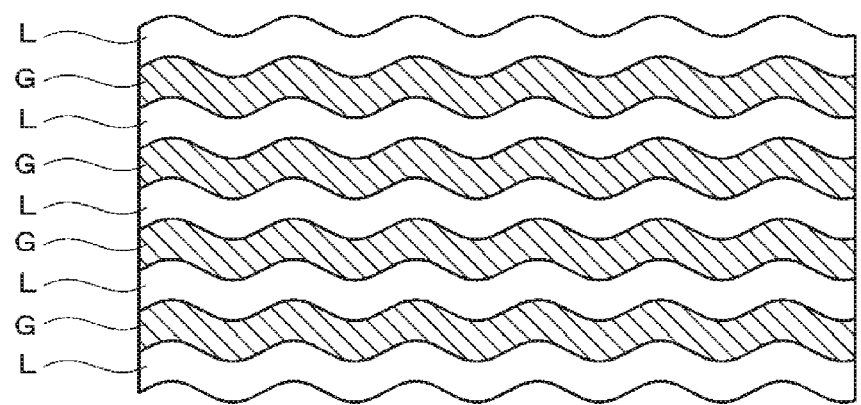
B

FIG.7

| | (NWL) | | | (NWL) |
|---|---|---|---|---|
| MSK20 | 30 | | MSK10 | 26 |
| MSK19 | 35 | | MSK9 | 25 |
| MSK18 | 34 | | MSK8 | 24 |
| MSK17 | 33 | | MSK7 | 23 |
| MSK16 | 32 | | MSK6 | 22 |
| MSK15 | 31 | | MSK5 | 21 |
| MSK14 | 30 | | MSK4 | 20 |
| MSK13 | 29 | | MSK3 | 19 |
| MSK12 | 28 | | MSK2 | 18 |
| MSK11 | 27 | | MSK1 | 17 |
| | | | | 56 |

OPTICAL INFORMATION RECORDING MEDIUM AND OPTICAL INFORMATION RECORDING MEDIUM REPRODUCING DEVICE

CROSS REFERENCE TO PRIOR APPLICATION

This application is a National Stage Patent Application of PCT International Patent Application No. PCT/JP2015/002882 (filed on Jun. 9, 2015) under 35 U.S.C. § 371, which claims priority to Japanese Patent Application No. 2014-174964 (filed on Aug. 29, 2014), which are all hereby incorporated by reference in their entirety.

TECHNICAL FIELD

The present disclosure relates to an optical information recording medium and an optical information recording medium reproducing device used for, for example, a recordable optical disk.

BACKGROUND ART

Thus far, an optical disk that uses laser light to record information or reproduce recorded information has been in practical use. Types of the optical disk include a reproduction-only type, a recordable type, and a rewritable type. In the recordable type and the rewritable type, it is necessary that address information indicating positions of the optical disk be recorded in advance in order to record information.

As a method for recording address information, there is known a system in which a signal that forms a trench called a wobble is modulated in accordance with the address information. The trench is referred to as a groove, and a track formed by the groove is referred to as a groove track. The groove is defined as a portion irradiated with laser light during the manufacturing of the optical disk, the area sandwiched between adjacent grooves is referred to as a land, and a track formed by the land is referred to as a land track.

In general, when recording address information, a synchronization portion (hereinafter, referred to as a sync pattern as appropriate) and a data portion (hereinafter, referred to as address data as appropriate) are recorded. The position where the address information is recorded is found by means of the sync pattern, and the address data are reproduced. It is desirable for the sync pattern to be clearly distinguishable from the address data.

For example, in a Blu-ray Disc (BD) (registered trademark), address information is recorded by a wobble groove, and data are allowed to be recorded on the groove (see Patent Literature 1). As the system for modulating the address, both minimum shift keying (MSK) and a saw-tooth wobble (STW) are used in the BD.

CITATION LIST

Patent Literature

Patent Literature 1: JP 4121265B

DISCLOSURE OF INVENTION

Technical Problem

The recording capacity can be increased by a land/groove recording system in which data are recorded on a land L and a groove G. However, it is necessary to reproduce address information in each of the groove and the land. When scanning the groove track, an RF signal of an adjacent land track leaks, and consequently the SNR of the reproduction signal of the wobble groove is degraded. On the other hand, when scanning the land track, not only is the SNR degraded due to the leakage of an RF signal from a groove track, but also the width of the land track varies; consequently, the SNR is further degraded. Thus, it is desirable to perform the detection of the sync pattern reliably even in a state where the SNR is degraded.

The conventionally proposed sync pattern detection circuit does not have sufficient capability to detect the sync pattern accurately in a state where the SNR is degraded like above.

Thus, an object of the present disclosure is to provide an optical information recording medium and an optical information recording medium reproducing device with which, in the case where address information is recorded by a wobble, a sync pattern can be reliably detected even in an environment in which the SNR is poor.

Solution to Problem

According to the present disclosure, there is provided an optical information recording medium including: a continuously wobbling groove formed in advance by a CAV or a zone CAV. Information is allowed to be recorded on the groove and a land adjacent to the groove, address information is recorded by modulating the wobble, the address information includes a sync pattern indicating a position of the address information and address data, and the sync pattern includes a plurality of first wobble patterns and a second wobble pattern between the first wobble patterns, and at least part of intervals of the first wobble patterns are set to unequal intervals.

According to the present disclosure, there is provided an optical information recording medium reproducing device configured to: optically reproduce an optical information recording medium, the optical information recording medium including a continuously wobbling groove formed in advance by a CAV or a zone CAV, in which information is allowed to be recorded on the groove and a land adjacent to the groove, address information is recorded by modulating the wobble, the address information includes a sync pattern indicating a position of the address information and address data, and the sync pattern includes a plurality of first wobble patterns and a second wobble pattern between the first wobble patterns, and at least part of intervals of the first wobble patterns are set to unequal intervals; detect the first wobble patterns to detect the sync pattern; and decode the address data by the detection of the sync pattern.

Advantageous Effects of Invention

According to at least one embodiment, in a land/groove recording system, a sync pattern can be reliably detected even in a situation where the SNR is poor due to the leakage of an RF signal, and address information can be correctly reproduced. The effect described herein is not necessarily limited, and may be any effect described in the present disclosure.

BRIEF DESCRIPTION OF DRAWINGS

FIG. 1 is a schematic diagram for describing an example of the optical disk and tracks of the optical disk.

FIG. 7 is a schematic diagram showing an example of the intervals of MSK marks in a sync pattern.

MODE(S) FOR CARRYING OUT THE INVENTION

The embodiment described below is a preferable specific example of the present disclosure, and is technically limited with preferable various limitations. However, in the following description, the scope of the present disclosure is not limited to these embodiments, unless it is described that the present disclosure is limited particularly.

The following description will be made in the next order.
<1. Embodiment>
<2. Modification Examples>

1. Embodiment

"Example of Optical Disk"

An optical information recording medium according to an embodiment of the present disclosure will now be described. FIG. 1A and FIG. 1B show an example of the configuration of an optical information recording medium according to an embodiment. The optical information recording medium is, for example, a high-density recording optical disk in a disc shape. FIG. 1A is an overview of the optical disk, and FIG. 1B is an enlarged view of a part of the optical disk of FIG. 1A.

As shown in FIG. 1A and FIG. 1B, in an optical disk 10, a groove G in a trench shape continuing spirally in the direction from the inner periphery to the outer periphery or the direction from the outer periphery to the inner periphery and a land L that is the area sandwiched between adjacent grooves G are formed. The groove G is formed during the manufacturing of the optical disk 10. The groove G is formed by, for example, applying laser light to a master disk coated with a photoresist.

Data are recorded by a land/groove recording system in which data are recorded on the land L and the groove G. The groove G of the optical disk 10 is a wobble groove. Address information is recorded by a system in which a signal that forms a wobble is modulated in accordance with the address information. In the present specification, the groove is defined as a portion irradiated with laser light during the manufacturing of the optical disk, a track formed by the groove is referred to as a groove track, the area sandwiched between adjacent grooves is referred to as the land, and a track formed by the land is referred to as a land track.

In an embodiment of the present disclosure, the disk is rotated at a constant angular velocity (hereinafter, referred to as a CAV) during recording in which a groove is formed. Also a zone CAV may be employed in which the disk is divided in the radius direction to form a plurality of zones and CAV control is performed in the zone. By the CAV or the zone CAV, in the spiral wobble track, the phases of the fundamental waves of wobbles can be synchronized with each other in the radius direction of the disk.

Figure 2:
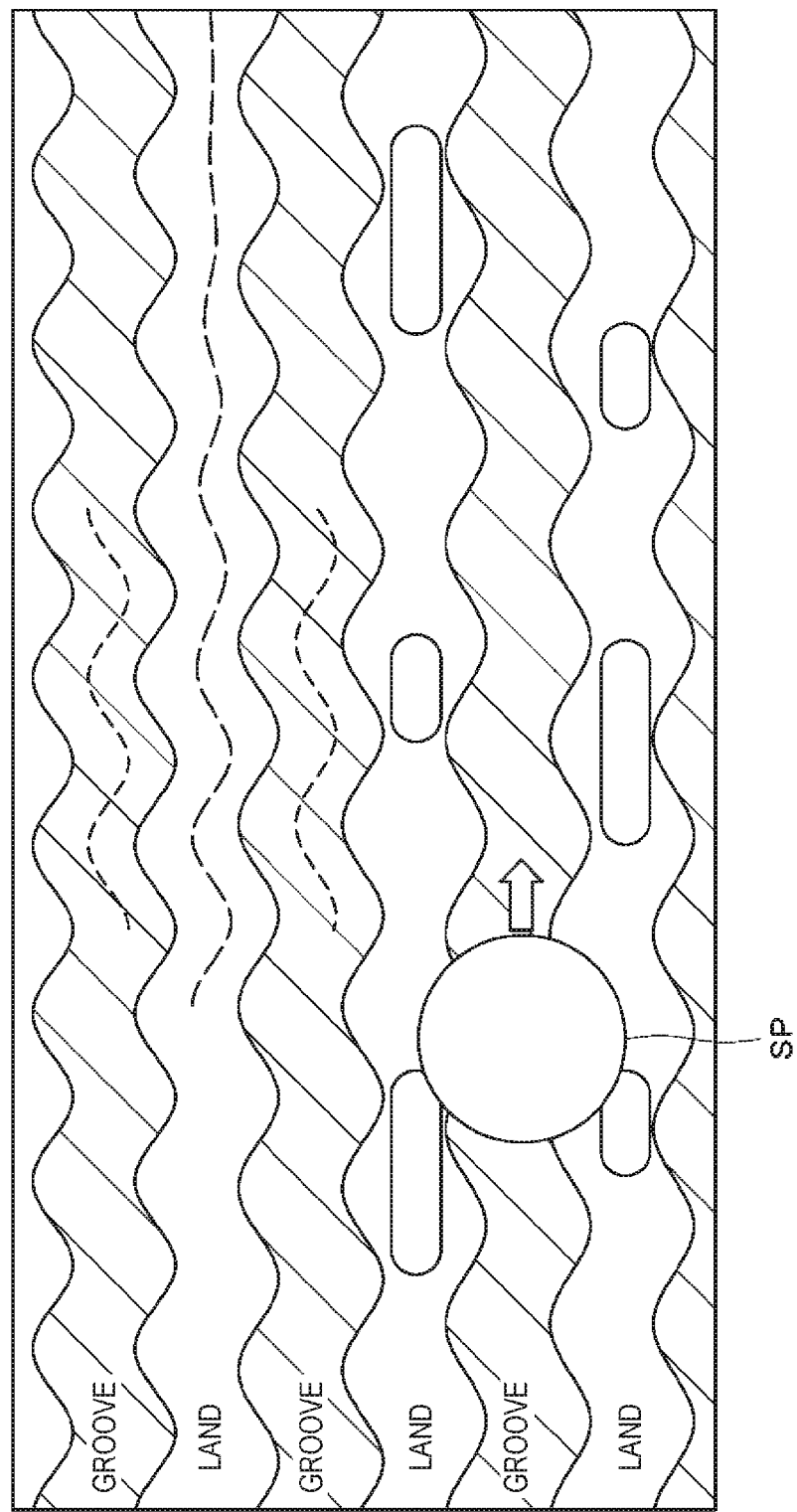
FIG. 2 is an enlarged schematic diagram showing a part of an optical disk of a land/groove recording system.
Figure 3:
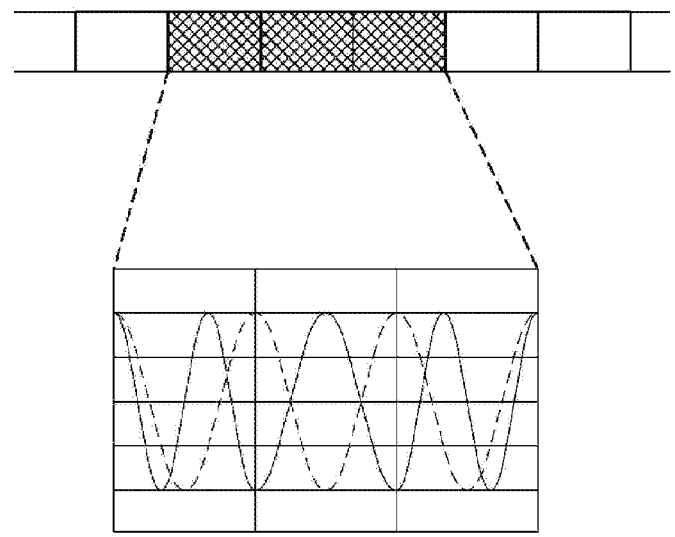
FIG. 3 is a schematic diagram for describing MSK that is an example of the modulation system.

FIG. 2 shows an enlarged view of a part of the optical disk 10. A situation in which a beam spot SP is scanned over, for example, the groove is shown. There is a problem that, when scanning the groove track, an RF signal of an adjacent land track leaks and consequently the SNR of the reproduction signal of the wobble groove is degraded. On the other hand, in the land track, not only does an RF of an adjacent groove track leak, but also the width of the land track varies; consequently, the SNR of the RF signal is degraded. It is desirable to perform the detection of the sync pattern reliably in view of these issues.

Modulation System

In an embodiment of the present disclosure, a first wobble pattern and a second wobble pattern are used as the sync pattern. MSK is used for the first wobble pattern, for example. The pattern formed by the system of MSK is referred to as an MSK mark. The second wobble pattern is a monotone (not-modulated) wobble.

The MSK mark is composed of three successive wobbles. The frequency of the front and rear wobbles is set to 1.5 times the frequency of the fundamental wave, and therefore the waveform of the center wobble has a polarity that is reversed with respect to the portion that has not undergone MSK. In the case where the groove is modulated by MSK, the difference with the fundamental wave is large. Therefore, there is an advantage that the MSK mark can be detected with good accuracy in a short section. However, there is a problem that the variation in land width is increased and the reproduction of the RF signal recorded in the land track (recorded data) is influenced. Furthermore, in the case where a reproduction signal of the wobble groove is used to form a clock synchronized with the reproduction signal by means of a phase-locked loop (PLL), it is not preferable to record a large number of MSK marks in terms of clock reproduction, because the synchronization of the PLL is unlocked in the section of the MSK mark.

"Address Information"

Figure 4:
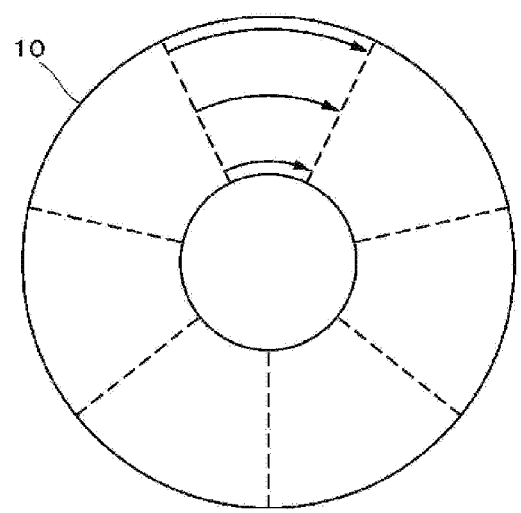
FIG. 4 is a schematic diagram for describing ADIP words of an embodiment of the present disclosure.

The address information is recorded in units of address-in-pregroove (ADIP) words. As an example, as shown in FIG. 4, the optical disk 10 is divided into 7 equal parts in radial directions, and one ADIP word is recorded in each divided region. Therefore, 7 ADIP words are recorded in one round of the optical disk 10.

Figure 5:
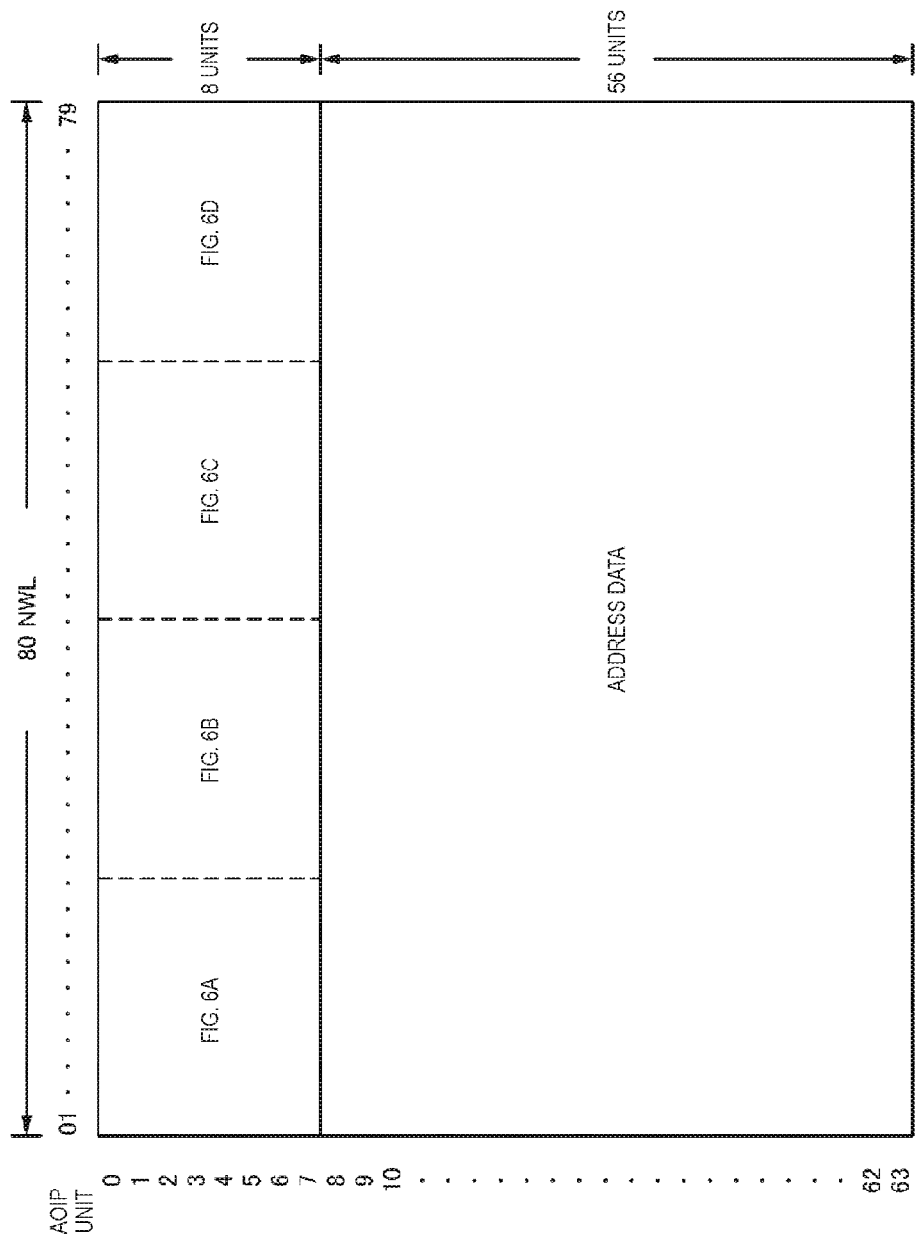
FIG. 5 is a schematic diagram for describing address information of an embodiment of the present disclosure.

FIG. 5 shows the configuration of an ADIP word. The ADIP word includes 64 ADIP units. One ADIP unit includes 80 NWLs. The NWL is one period of the fundamental wave of the wobble. In the optical disk 10, the ADIP unit of ADIP unit No. 0 to the ADIP unit of ADIP unit No. 63 are sequentially recorded.

The front-end 8 ADIP units (Nos. 0 to 7) are used as the sync pattern of the ADIP word. The other 56 ADIP units (Nos. 8 to 63) are used as the address data. In the case of the address data, each ADIP unit expresses 1 bit of data. The sync pattern uses MSK, whereas the address data employ another modulation system. However, it is possible to employ the same modulation system.

An example of the other modulation system is a modulation system in which MSK is modified. This modulation system is referred to as MSK modification (+) and MSK modification (−). Each is a system in which, when the frequency of the fundamental wave of the wobble is denoted by f, the waveforms described below appear successively in a section of 8 NWLs as below. The waveform of the section on the front side is set to +cos (f).

MSK modification (+): +cos (0.75f), +sin (f)×6, +sin (1.25f)

MSK modification (−): +cos (1.25f), −sin (f)×6, −sin (0.75f)

Since each of the 56 ADIP units of the address data expresses 1 bit of data, the address data are composed of 56 bits. In an embodiment, a sequential number (20 bits), a layer number (3 bits including A/B surface identification), and a reserve bit (1 bit) are prescribed, and error correction encoding is performed on these address data; as a result, 32 bits of redundant code (referred to as parity as appropriate) are generated.

The sync pattern located at the front end of the ADIP word will now be described with reference to FIG. 6. FIG. 6A to FIG. 6D show diagrams obtained by dividing the region of the sync pattern of FIG. 5 (ADIP unit Nos. 0 to 7) into 4 equal parts in the horizontal direction. That is, FIG. 6A shows the region of NWLs 0 to 19, FIG. 6B shows the region of NWLs 20 to 39, FIG. 6C shows the region of NWLs 40 to 59, and FIG. 6D shows the region of NWLs 60 to 79.

Figure 6:
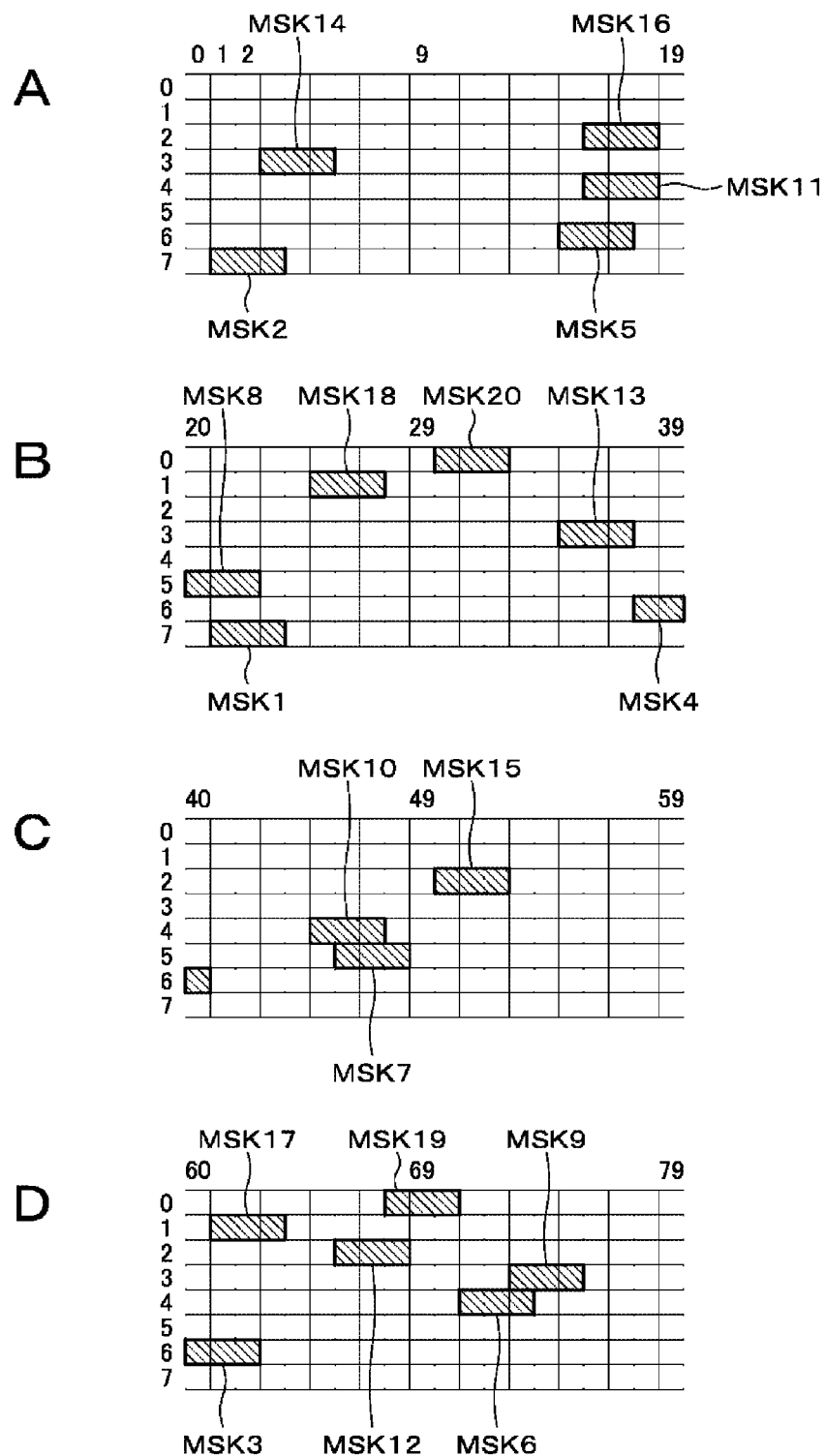
FIG. 6 is a schematic diagram used for a description of the case where MSK marks of a sync pattern are recorded at unequal intervals.

As shown in FIG. 6, 20 MSK, marks (expressed as MSK1 to MSK20) are recorded as the sync pattern. Recording (reproduction) is performed in the order of MSK20, MSK19, MSK18, . . . , and MSK1. The intervals of the MSK marks are set to unequal intervals. FIG. 7 shows the intervals of the MSK marks. The interval refers to the number of periods of the monotone existing between two MSK marks. However, the interval may be defined as the interval between the front ends of two MSK marks. It is not necessary for all the intervals of the 20 MSK marks to be unequal, and it is sufficient that at least part of them be unequal.

The front-end MSK mark of the ADIP word, MSK20, is recorded in the position 30 NWLs after the front-end position. The next, MSK19, is detected in the position 35 NWLs after MSK20. After that, the intervals of the MSK marks are reduced one by one. The interval between the last two, MSK2 and MSK1, is set to 17. A section of 56 NWLs is located from the rear side of MSK1 to the last position of the sync pattern of the ADIP word. The intervals are thus set to become shorter with increasing proximity to the address data.

"Improvement of SNR of Sync Pattern"

Figure 8:
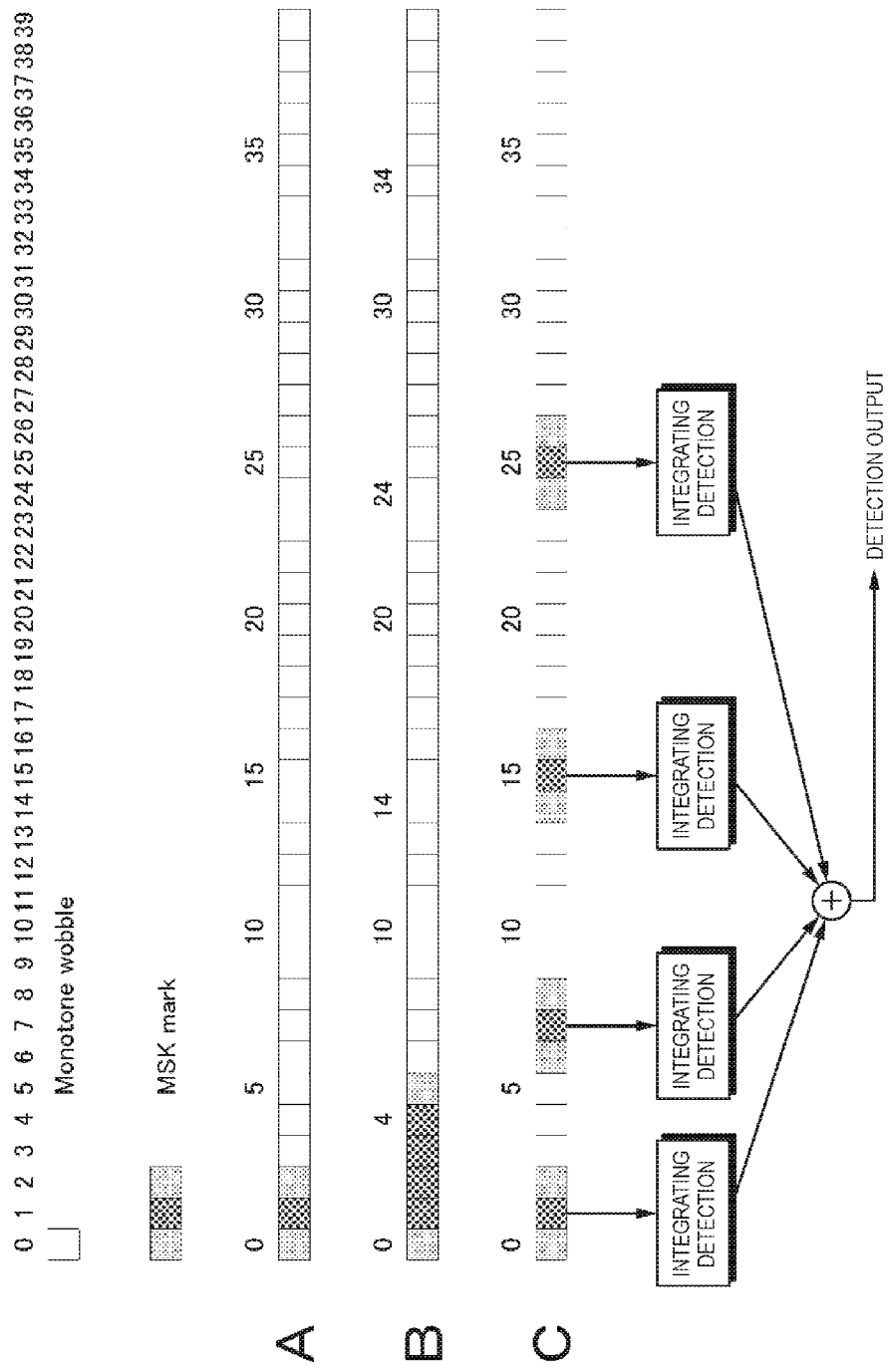
FIG. 8 is a schematic diagram for describing an advantage of an embodiment of the present disclosure.

In the sync pattern in an embodiment of the present disclosure, a short MSK mark is recorded in a plurality of places, and the plurality of MSK marks are detected simultaneously; therefore, the precision of detection of the synchronization position can be made higher than in a sync pattern in which the section of a center portion of an MSK mark is repeated. For example, FIG. 8A shows a basic form of an MSK mark, and FIG. 8B shows a form in which a center portion of the MSK mark is elongated to 4 waves and the entire length of the mark is made a length of 6 NWLs. In FIG. 8, the length of the section where the sync pattern is inserted is set to 40 NWLs, for example.

Figure 9:
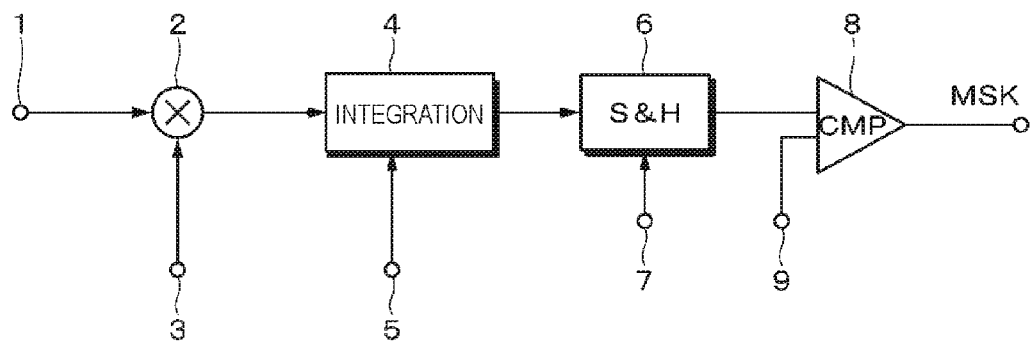
FIG. 9 is a block diagram of an example of the detection circuit of MSK marks.

A conventional MSK demodulation circuit has the configuration shown in FIG. 9. A wobble signal reproduced from a disk is supplied to an input terminal 1. The wobble signal and a carrier signal from an input terminal 3 are multiplied by a multiplier 2. The carrier signal is a signal synchronized with a reproduction signal, and a carrier with the same frequency is multiplied during the demodulation of MSK.

An output signal of the multiplier 2 is supplied to an integrator 4. A reset signal is inputted to the integrator 4 from a terminal 5, and the integrator 4 is reset by the reset signal and the value stored in the integrator 4 returns to the initial value, for example 0. An output signal of the integrator 4 is supplied to a sample and hold circuit 6.

A sampling pulse is supplied to the sample and hold circuit 6 from a terminal 7. The sampling pulse samples and holds the output of the integrator 4. An output signal of the sample and hold circuit 6 is supplied to a comparison circuit 8.

A reference level is supplied to the comparison circuit 8 from a terminal 9. The reference level is the median value of the wobble signal outputted from the sample and hold circuit 6. In the case where the input signal is larger than the reference level, the comparison circuit 8 generates an output of a value of (+1); conversely, in the case where the input signal is smaller than the reference level, the comparison circuit 8 generates an output of a value of (−1). A demodulation output of MSK is obtained from the comparison circuit 8. In the case of the MSK mark, a detection output of (+1) is obtained in, among the 3 NWLs, the front section and the rear section, and a detection output of (−1) is obtained in the center section. However, in the following description, it is assumed that the polarity is reversed, and a detection output of (+1) is obtained in the center section and a detection output of (−1) is obtained in the other sections.

In the case where such an integrating detection circuit is used, when NWL Nos. 1 to 4 are the section to be detected as shown in FIG. 8B, 4 detection outputs of (+1) are obtained, and therefore the total value is (+4). In contrast, when a section shifted by 1 NWL (e.g. the section of NWL Nos. 2 to 5) is detected, a total value of (+2) is obtained. Thus, a pattern in which a center section of an MSK mark is elongated like in FIG. 8B has the problem that the difference between the correct detection output and the false detection output is small. Therefore, false detection may be made when the SNR is poor.

In contrast, in an embodiment of the present disclosure, MSK marks are recorded scatteredly as shown in FIG. 8C. The MSK marks are detected in the correct positions where the MSK marks are recorded (NWL Nos. 1, 7, 15, and 25), the detection results are added, and the resulting value is taken as the detection output. In this method, on being shifted by 1 NWL, the total value of detection output is changed from (+4) to (−4). Thus, the difference in detection output is large, and therefore there is an advantage that the possibility that the position of a section shifted by 1 NWL will be falsely detected as the sync pattern can be reduced.

Figure 10:
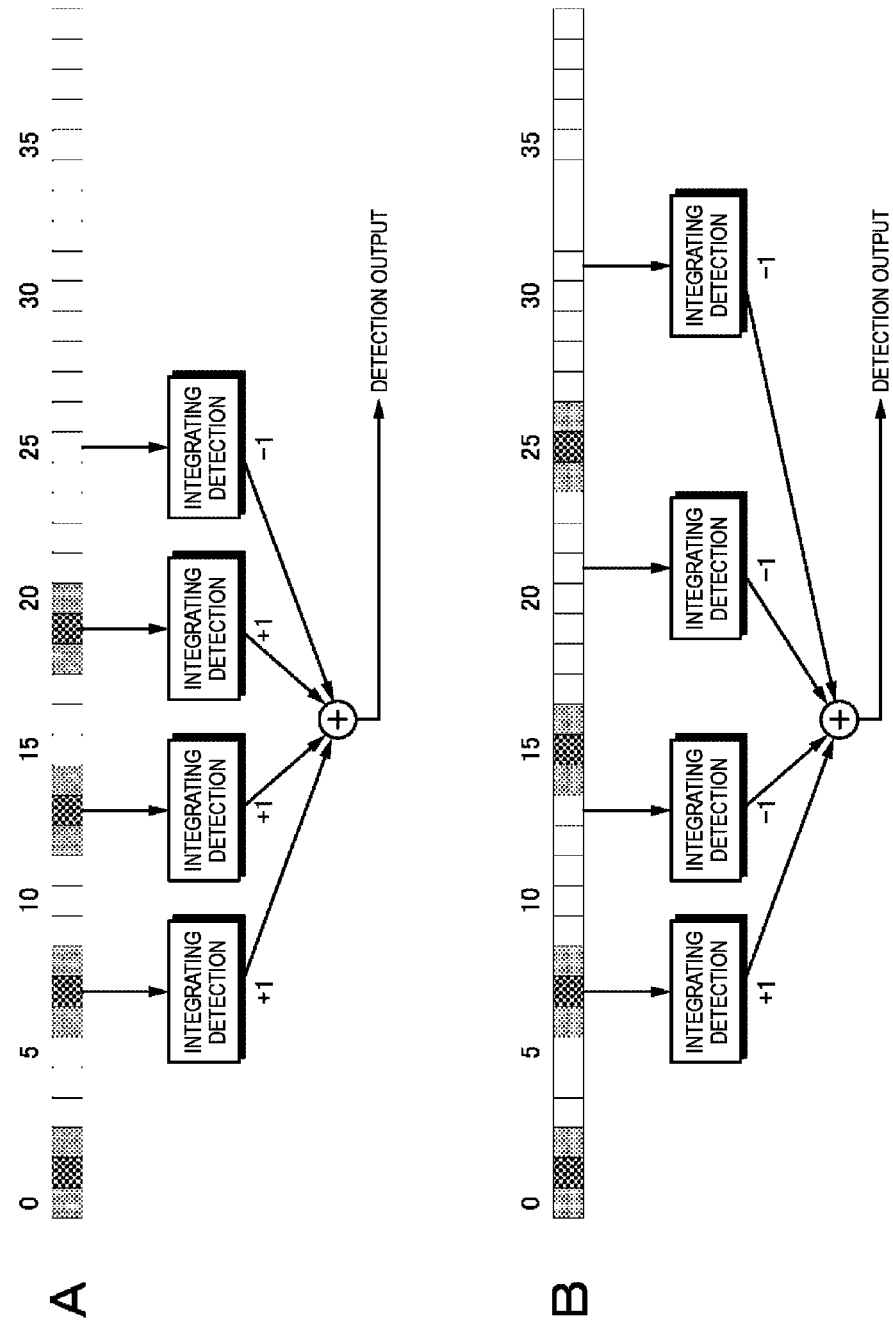
FIG. 10 is a schematic diagram for describing an advantage of an embodiment of the present disclosure.

Next, in an embodiment of the present disclosure, a plurality of MSK marks are arranged at unequal intervals. As an example, MSK marks are arranged at unequal intervals that become narrower with increasing proximity to the address data. The frequency of the appearance of MSK marks is set at a level that does not influence the reproduction of a wobble clock by a PLL. For comparison, a sync pattern in which MSK marks are arranged at equal intervals (e.g. intervals of 3 NWLs) as shown in FIG. 10A is investigated. The example of FIG. 10A is an example in which the length of the section where the sync pattern is inserted is set to, for example, 40 NWLs and the 4 MSK marks from the front end are arranged at mutual intervals of 3 NWLs.

When the 4 MSK marks are correctly detected, a detection output of +4 is obtained. When the detection position is shifted by 6 NWLs (FIG. 10A), the center positions of 3 MSK marks are detected, and therefore the total value of detection output is (+2). Thus, there is a problem that a detection output with a small difference with the correct detection output occurs with periods corresponding to the interval of the arrangement of MSK marks.

In an embodiment of the present disclosure, MSK marks are arranged at unequal intervals as described above. For example, the interval is set to (3, 5, 7, 13) as shown in FIG. 10B. When the detection position is shifted by 6 NWLs like in the example of FIG. 10A, what obtains a detection output of (+1) is only one integrating detection circuit, and therefore the total value of detection output is (−2). The difference with the value of (+4) obtained in the case of the correct detection position is large, and the possibility of false detection can be reduced. It is not necessary for all the plurality of intervals to be unequal, and it is possible for a small proportion of all the intervals to be equal intervals.

When arranging MSK marks, it may be possible to use a method in which, not using unequal intervals, MSK marks are placed in positions of the value of "1" of a pseudo-random number sequence, for example a maximum-length linear shift-register sequence (an M sequence). As a specific example, the following is an M sequence having a period of ($2^5-1=31$). MSK marks are arranged to correspond to "1" in the sequence.

(1010111011000111110011010010000)

In this method, the possibility of false detection is low, and the number of MSK marks is large; thus, there is an advantage that the total value of the detection signals in the correct synchronization position is a large value. However, there is a problem that, in a portion where "1" appears successively, a disturbance occurs in a long section of the wobble PLL, and the clock reproduction becomes unstable. For the portion where "1" appears successively, n "1"s appear successively in the case of a period of ($2^n-1$). Hence, it cannot be said that using a pseudo-random number sequence is a preferred method.

"Sync Pattern Detection Device"

An embodiment of the sync pattern detection device according to the present disclosure will now be described with reference to FIG. 11. A wobble waveform reproduced from an optical disk is supplied to a multiplier 12 of an MSK mark detection unit 11 shown by being enclosed by the broken line. This wobble waveform is a signal after the processing of a wobble PLL. The multiplier 12 has the function of a wave detection circuit that generates a wave detection output based on the first wobble pattern and a reference wave.

A wobble signal reproduced from the disk and a reference waveform 13 are supplied to the multiplier 12. The reference waveform 13 is a wobble waveform synchronized with a reproduction signal. The reference waveform may be a carrier signal like in a conventional MSK demodulation circuit, or may be three wobble waveforms similar to the MSK mark. The output of the multiplier 12 is supplied to an accumulation circuit 14, and output signals of the multiplier 12 are accumulated for a prescribed period of time. The output of the accumulation circuit 14 is a signal having an analog value. The analog value has a level in accordance with the degree of correlation with the MSK mark.

A conventional MSK demodulation circuit has the configuration shown in FIG. 9. A wobble signal reproduced from a disk is supplied to the input terminal 1. The wobble signal and a carrier signal from the input terminal 3 are multiplied by the multiplier 2. The carrier signal is a signal synchronized with a reproduction signal, and a carrier with the same frequency is multiplied during the demodulation of MSK.

The output signal of the accumulation circuit 14 is supplied to a delay and addition unit 15. The delay and addition unit 15 includes a series connection of a plurality of delay circuits to which the accumulation output of the accumulation circuit 14 is supplied and in which the respective amounts of delay are set so as to simultaneously detect a plurality of MSK marks included in the sync pattern and an adder that adds a plurality of accumulation outputs extracted from the series connection of delay circuits. Specifically, the delay and addition unit 15 includes delay circuits DL1 to DL19 having amounts of delay corresponding to the intervals of the MSK marks described above. At the correct synchronization detection timing, an analog value corresponding to the MSK mark of MSK1 is generated on the input side of the delay circuit DL1, analog values corresponding to MSK2 to MSK19 are generated between adjacent stages of the delay circuits DL2 to DL19, respectively, and an analog value corresponding to MSK20 is generated on the output side of the delay circuit DL20 of the last stage.

These 20 analog values are added by an adder 16, and a sync detection signal is obtained from the adder 16. The sync detection signal is supplied to a threshold assessment circuit 17, and is compared to a prescribed threshold. At the correct synchronization detection timing, for example, the sync detection signal is lower than the threshold, and a detection output at a high level is generated. This detection output serves as a sync pattern detection output. If the detection position is shifted, the sync detection signal is a value not less than the threshold in the threshold assessment circuit 17, and a detection output at a low level is generated.

Figure 11:
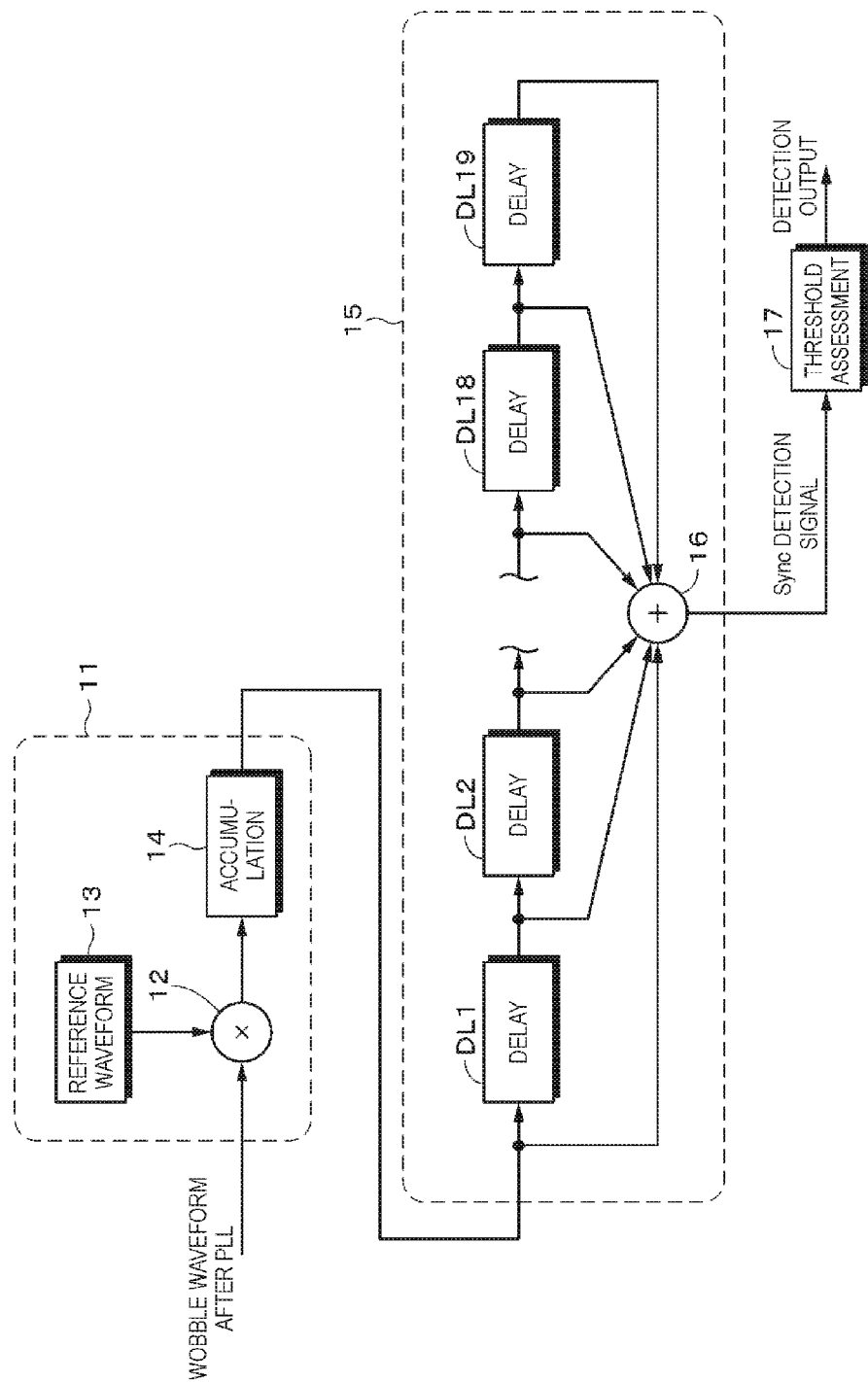
FIG. 11 is a block diagram of a sync pattern detection device of an embodiment of the present disclosure.

The sync pattern detection circuit shown in FIG. 11 does not perform threshold assessment in 20 detection positions, but adds analog values as they are and then performs assessment by comparing the addition value to the threshold in the threshold assessment circuit 17. Therefore, even in a case where threshold assessment on the basis of one-by-one detection positions would yield a false assessment result, the possibility of the occurrence of a false assessment result can be reduced by performing threshold assessment after adding the analog values obtained in all the detection positions.

In the one embodiment of the present disclosure described above, the difference in the level of the detection signal is large between the correct synchronization position and the other positions, and therefore synchronization can be reliably obtained. Furthermore, the influence on the wobble PLL can be reduced by appropriately selecting the frequency of the appearance of MSK marks.

In a monotone portion, the PLL can be pulled in easily because there is no influence on the PLL due to wobble modulation. In an embodiment of the present disclosure, a monotone portion is provided on the front side of the sync pattern, and the pull-in of the PLL is promising. Furthermore, even if the pull-in of the PLL is incomplete on the front side of the sync pattern, the configuration in which the intervals of the MSK marks become wider with increasing proximity to the front end of the sync pattern acts on the pull-in of the PLL effectively, and furthermore makes it possible to keep low the number of losses of MSK detection due to the instability of the PLL; thus, the probability of the sync pattern being able to be detected immediately from the pull-in of the PLL can be enhanced.

If the SNR of the sync detection signal is improved in the future by, for example, improvements in the material of the disk, the method for manufacturing the disk, and the method for recording a signal, etc., the circuit may be configured so as to detect only part of the sync pattern, not the entire sync pattern, and thereby the scale of the sync detection circuit can be reduced. In this event, the SNR of the sync detection signal is proportional to the number of MSK marks used for detection, whereas the scale of the detection circuit depends on not only the number of MSKs but also the amount of delay in the delay circuit. Therefore, when it is attempted to reduce the number of MSKs used for detection, it is efficient to not use MSKs in the order from the MSK with the widest interval. In an embodiment of the present disclosure, the intervals of the MSK marks are set to become shorter with increasing proximity to the address data, and therefore in this case it is desirable to not use MSKs in the order from the MSK farthest from the address data. In this case, the distance from the last MSK mark used for detection to the address data is fixed regardless of the number of MSKs not to be used, and therefore the design of the detection circuit becomes easy.

"Disk Reproducing Device"

Figure 12:
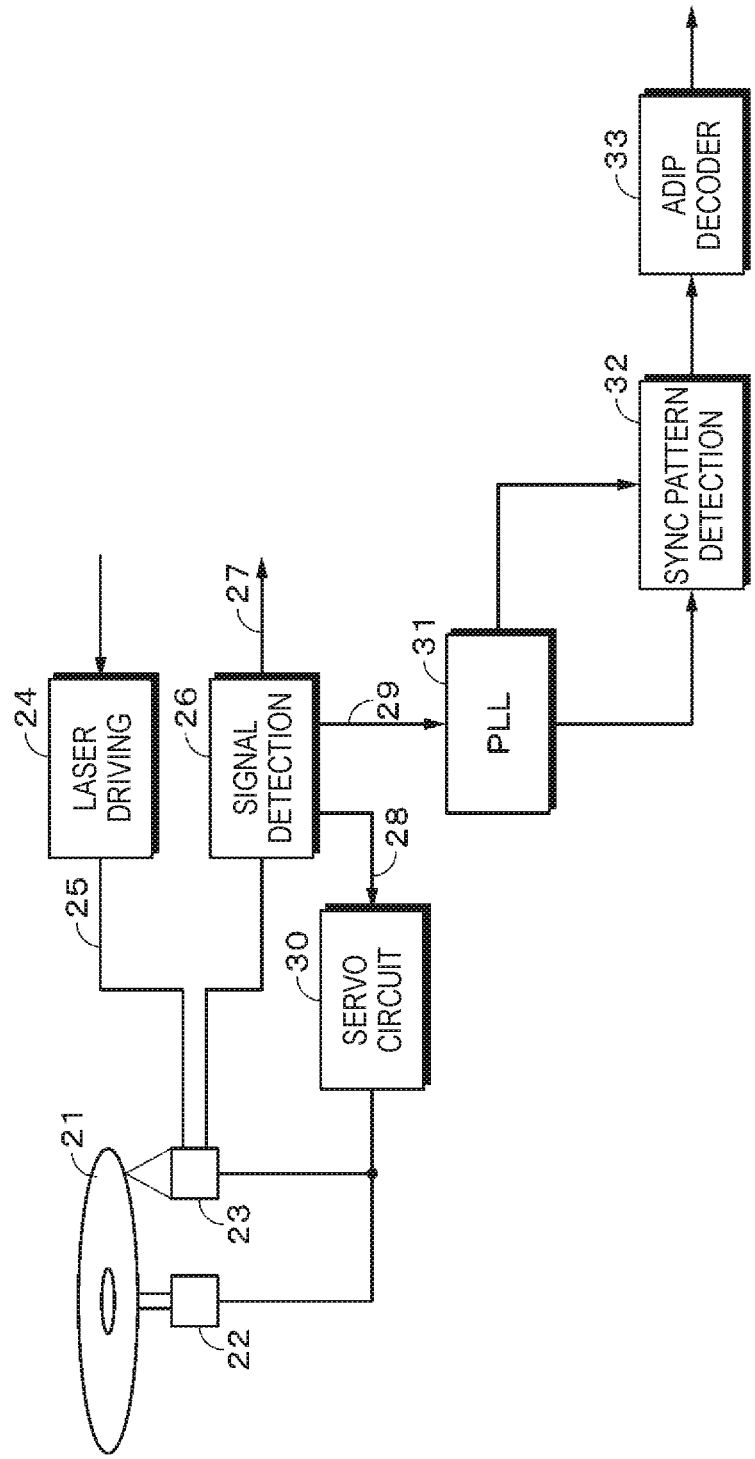
FIG. 12 is a block diagram of a reproducing device of an embodiment of the present disclosure.

A disk reproducing device according to an embodiment of the present disclosure will now be described, mainly for the reproduction of addresses. As shown in FIG. 12, data are recorded on an optical disk 21, and data are reproduced from the optical disk 21.

The optical disk 21 is rotated by a spindle motor 22. A driving signal from a laser driving unit 24 is supplied to an optical head 23, and a laser beam in which the intensity is modulated in accordance with recording data 25 is applied to the optical disk 21 from the optical head 23; thus, data are recorded on a prescribed position of the optical disk 21 determined on the basis of reproduced address information.

A reading laser beam from the optical head 23 is applied to the optical disk 21, the reflected light is detected by a photodetector in the optical head 23, and a reproduction signal is detected by a signal detection unit 26. A reproduction signal 27, a servo error signal 28 such as a focus error signal and/or a tracking error signal, and a wobble signal 29 are extracted from the signal detection unit 26. The wobble signal 29 is an output signal of a detector in which the light detection element is divided into two parts in the track direction. For example, a signal of the sum of the signals of two detectors is extracted as the wobble signal 29. The wobble signal 29 is a signal in accordance with the wobble waveform.

The servo error signal 28 is supplied to a servo circuit 30. The rotation of the spindle motor 22 is controlled at a constant angular velocity by the servo circuit 30, and the focus and tracking of the optical head 23 are controlled.

The wobble signal 29 detected by the signal detection unit 26 is supplied to a PLL 31. An output signal of the PLL 31 is supplied to a sync pattern detection circuit 32. A clock synchronized with the reproduction signal is outputted from the PLL 31. The clock serves as a reference of the timing of processing during reproduction. The clock is supplied to the sync pattern detection circuit 32 from the PLL 31.

As described with reference to FIG. 11, the sync pattern detection circuit 32 detects the sync pattern at the front end of each ADIP word. A detection signal of the sync pattern and data are supplied to an ADIP decoder 33. The ADIP decoder 33 decodes the address data recorded in each ADIP word etc., and performs error correction.

2. Modification Examples

The embodiments of the present disclosure have been described specifically. However, embodiments of the present disclosure are not limited to the above-described embodiment, but may be modified in various ways based on the technical sprit and essence of the present disclosure. For example, the configurations, the methods, the processes, the shapes, the materials, the numerical values, and the like mentioned in the above-described embodiments are merely examples. Different configurations, methods, processes, shapes, materials, numerical values, and the like may be used, as necessary.

Additionally, the present technology may also be configured as below.

(1)

An optical information recording medium including:
a continuously wobbling groove formed in advance by a CAV or a zone CAV,
wherein information is allowed to be recorded on the groove and a land adjacent to the groove,
address information is recorded by modulating the wobble,
the address information includes a sync pattern indicating a position of the address information and address data, and
the sync pattern includes a plurality of first wobble patterns and a second wobble pattern between the first wobble patterns, and at least part of intervals of the first wobble patterns are set to unequal intervals.

(2)

The optical information recording medium according to (1), wherein the second wobble pattern is a pattern in which the first wobble pattern is phase-modulated.

(3)

The optical information recording medium according to (1), wherein the first wobble pattern is an MSK mark, and the second wobble pattern is a monotone.

(4)

The optical information recording medium according to (1), wherein the intervals of the first wobble patterns change in stages by adding or subtracting a fixed number.

(5)

The optical information recording medium according to (4), wherein the intervals of the first wobble patterns are set to become smaller with increasing proximity to the address data.

(6)

The optical information recording medium according to (5), wherein the intervals are set such that the interval between the first wobble pattern in the front-end position and the first wobble pattern in the second position is 35 NWLs and the intervals decrease 1 NWL at a time.

(7)

The optical information recording medium according to (1),
wherein a prescribed number of second wobble patterns are interposed between the front-end position of the address information and a position of the first wobble pattern in the front-end position, and
a prescribed number of second wobble patterns are interposed between the last position of the address information and a position of the first wobble pattern in the last position.

(8)

An optical information recording medium reproducing device configured to:
optically reproduce an optical information recording medium,
the optical information recording medium including
a continuously wobbling groove formed in advance by a CAV or a zone CAV, in which information is allowed to be recorded on the groove and a land adjacent to the groove, address information is recorded by modulating the wobble, the address information includes a sync pattern indicating position of the address information and address data, and the sync pattern includes a plurality of first wobble patterns and a second wobble pattern between the first wobble patterns, and at least part of intervals of the first wobble patterns are set to unequal intervals;

detect the first wobble patterns to detect the sync pattern; and decode the address data by the detection of the sync pattern.

(9)

The optical information recording medium reproducing device according to (8), including:

a wave detection circuit configured to generate a wave detection output based on the first wobble pattern and a reference wave;

an accumulation circuit configured to accumulate outputs of the wave detection circuit;

a series connection of a plurality of delay circuits to which an output of the accumulation is supplied and in which the respective amounts of delay are set so as to simultaneously detect the plurality of first wobble patterns included in the sync pattern;

an adder configured to add a plurality of accumulation outputs extracted from the series connection of delay circuits; and a threshold assessment circuit configured to perform threshold assessment on an output of the adder.

(10)

The optical information recording medium reproducing device according to (8), wherein the second wobble pattern is a pattern in which the first wobble pattern is phase-modulated.

(11)

The optical information recording medium reproducing device according to (8), wherein the first wobble pattern is an MSK mark, and the second wobble pattern is a monotone.

(12)

The optical information recording medium reproducing device according to (8), wherein the intervals of the first wobble patterns change in stages by adding or subtracting a fixed number.

(13)

The optical information recording medium reproducing device according to (12), wherein the intervals of the first wobble patterns are set to become smaller with increasing proximity to the address data.

(14)

The optical information recording medium reproducing device according to (13), wherein the intervals are set such that the interval between the first wobble pattern in the front-end position and the first wobble pattern in the second position is 35 NWLs and the intervals decrease 1 NWL at a time.

(15)

The optical information recording medium reproducing device according to (8), wherein a prescribed number of second wobble patterns are interposed between the front-end position of the address information and a position of the first wobble pattern in the front-end position, and a prescribed number of second wobble patterns are interposed between the last position of the address information and a position of the first wobble pattern in the last position.

REFERENCE SIGNS LIST

10 optical disk
11 MSK mark detection unit
15 delay and addition unit
22 spindle motor
23 optical head
31 PLL
32 sync pattern detection circuit
33 ADIP decoder

The invention claimed is:

1. An optical information recording medium comprising:
a continuously wobbling groove formed in advance by a constant angular velocity (CAV) or a zone CAV,
wherein information is allowed to be recorded on the groove and a land adjacent to the groove,
address information is recorded by modulating the wobble,
the address information includes a sync pattern indicating a position of the address information and address data, and
the sync pattern includes a plurality of first wobble patterns and a second wobble pattern between the first wobble patterns, and at least part of intervals of the first wobble patterns are set to unequal intervals,
wherein the at least part of the intervals decrease by 1 normal wave length (NWL) at a time.

2. The optical information recording medium according to claim 1, wherein the second wobble pattern is a pattern in which the first wobble pattern is phase-modulated.

3. The optical information recording medium according to claim 1, wherein the first wobble pattern is an minimum shift keying (MSK) mark, and the second wobble pattern is a monotone.

4. The optical information recording medium according to claim 1, wherein the at least part of the intervals of the first wobble patterns change in stages by adding or subtracting a fixed number.

5. The optical information recording medium according to claim 4, wherein the at least part of the intervals of the first wobble patterns are set to become smaller with increasing proximity to the address data.

6. The optical information recording medium according to claim 5, wherein the at least part of the intervals are set such that interval between the first wobble pattern in a front-end position and the first wobble pattern in a second position is 35 normal wave lengths (NWLs).

7. The optical information recording medium according to claim 1,
wherein a prescribed number of second wobble patterns are interposed between a front-end position of the address information and a position of the first wobble pattern in the front-end position, and
a prescribed number of second wobble patterns are interposed between a last position of the address information and a position of the first wobble pattern in the last position.

8. An optical information recording medium reproducing device configured to:
optically reproduce an optical information recording medium,
the optical information recording medium including a continuously wobbling groove formed in advance by a constant angular velocity (CAV) or a zone CAV, in which information is allowed to be recorded on the groove and a land adjacent to the groove, address information is recorded by modulating the wobble, the address information includes a sync pattern indicating a position of the address information and address data, and the sync pattern includes a plurality of first wobble patterns and a second wobble pattern between the first wobble patterns, and at least part of intervals of the first wobble patterns are set to unequal intervals, wherein the at least part of the intervals decrease by 1 normal wave length (NWL) at a time;

detect the first wobble patterns to detect the sync pattern; and decode the address data by the detection of the sync pattern, wherein the optical information recording medium reproducing device comprises:

a wave detection circuit configured to generate a wave detection output based on the first wobble pattern and a reference wave;

an accumulation circuit configured to accumulate outputs of the wave detection circuit;

a series connection of a plurality of delay circuits to which an output of the accumulation is supplied and in which respective amounts of delay are set so as to simultaneously detect the plurality of first wobble patterns included in the sync pattern;

an adder configured to add a plurality of accumulation outputs extracted from the series connection of delay circuits; and a threshold assessment circuit configured to perform threshold assessment on an output of the adder.

9. The optical information recording medium reproducing device according to claim 8, wherein the second wobble pattern is a pattern in which the first wobble pattern is phase-modulated.

10. The optical information recording medium reproducing device according to claim 8, wherein the first wobble pattern is an minimum shift keying (MSK) mark, and the second wobble pattern is a monotone.

11. The optical information recording medium reproducing device according to claim 8, wherein the at least part of the intervals of the first wobble patterns change in stages by adding or subtracting a fixed number.

12. The optical information recording medium reproducing device according to claim 11, wherein the at least part of the intervals of the first wobble patterns are set to become smaller with increasing proximity to the address data.

13. The optical information recording medium reproducing device according to claim 12, wherein the at least part of the intervals are set such that interval between the first wobble pattern in a front-end position and the first wobble pattern in a second position is 35 normal wave lengths (NWLs).

14. The optical information recording medium reproducing device according to claim 8, wherein a prescribed number of second wobble patterns are interposed between a front-end position of the address information and a position of the first wobble pattern in the front-end position, and a prescribed number of second wobble patterns are interposed between a last position of the address information and a position of the first wobble pattern in the last position.

* * * * *